(12) United States Patent
Sinclair et al.

(10) Patent No.: US 7,034,271 B1
(45) Date of Patent: Apr. 25, 2006

(54) LONG WORKING DISTANCE INCOHERENT INTERFERENCE MICROSCOPE

(75) Inventors: Michael B. Sinclair, Albuquerque, NM (US); Maarten P. De Boer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 147 days.

(21) Appl. No.: 10/857,115

(22) Filed: May 27, 2004

(51) Int. Cl.
G02B 27/40 (2006.01)
G02B 27/64 (2006.01)
G02B 7/04 (2006.01)

(52) U.S. Cl. .................................. 250/201.3; 359/386

(58) Field of Classification Search ............. 250/201.3; 359/386, 368, 345
See application file for complete search history.

(56) References Cited

U.S. PATENT DOCUMENTS

| | | |
|---|---|---|
| 4,978,219 A | 12/1990 | Bessho |
| 5,042,949 A | 8/1991 | Greenberg et al. |
| 5,127,614 A | 7/1992 | Etzold et al. |
| 5,973,786 A | 10/1999 | Yoon et al. |
| 5,995,227 A | 11/1999 | Velzel et al. |
| 6,172,752 B1 | 1/2001 | Haruna et al. |
| 6,208,415 B1 | 3/2001 | De Boer et al. |
| 6,226,089 B1 | 5/2001 | Hakamata |
| 6,522,407 B1 | 2/2003 | Everett et al. |
| 6,721,094 B1 | 4/2004 | Sinclair et al. |
| 2003/0002048 A1* | 1/2003 | Zanoni .................. 356/512 |

OTHER PUBLICATIONS

M. Pluta, "Advanced Light Microscopy, vol. 3, Measuring Techniques", PWN—Polish Scientific Publishers, 1993, pp. 328-341.

D. M. Gale, M. I. Pether, and J. C. Dainty, "Linnik Microscope Imaging of Integrated Circuit Structures", Applied Optics, vol. 35, No. 1, Jan. 1996, pp 131-137.

W. Hemmert, M. S. Mermelstein and D. M. Freeman, "Nanometer Resolution of Three-Dimensional Motions Using Video Interference Microscopy", Paper presented at the IEEE International MEMS 99, Orlando FL, Jan. 17-21, 1999.

"Molecular Expressions Microscopy Primer Anatomy of the Microscope", http://micro.magnet.fsu,edu/primer/anatomy/objectives.html, Jan. 2001.

Guoqiang Li, Pang-Chen Sun, Paul C. Lin and Yeshayahu Fainman, "Interference Microscopy for Three-Dimensional Imaging with Wavelength-to-depth Encoding", 2000.

* cited by examiner

*Primary Examiner*—David Porta
*Assistant Examiner*—Tony Ko
(74) *Attorney, Agent, or Firm*—Robert D. Watson

(57) ABSTRACT

A full-field imaging, long working distance, incoherent interference microscope suitable for three-dimensional imaging and metrology of MEMS devices and test structures on a standard microelectronics probe station. A long working distance greater than 10 mm allows standard probes or probe cards to be used. This enables nanometer-scale 3-dimensional height profiles of MEMS test structures to be acquired across an entire wafer while being actively probed, and, optionally, through a transparent window. An optically identical pair of sample and reference arm objectives is not required, which reduces the overall system cost, and also the cost and time required to change sample magnifications. Using a LED source, high magnification (e.g., 50×) can be obtained having excellent image quality, straight fringes, and high fringe contrast.

33 Claims, 5 Drawing Sheets

LONG WORKING DISTANCE INCOHERENT INTERFERENCE MICROSCOPE

FEDERALLY SPONSORED RESEARCH

The United States Government has rights in this invention pursuant to Department of Energy Contract No. DE-AC04-94AL85000 with Sandia Corporation.

FIELD OF THE INVENTION

The present invention relates generally to the fields of microscopy and metrology, and more specifically to interference microscopes used for non-contact, ultra-high resolution optical profiling and metrology of integrated circuits and MEMS devices.

BACKGROUND OF THE INVENTION

Microelectromechanical systems (MEMS) devices are used for a variety of applications including optical switches and displays, microrelays, accelerometers, gyroscopes, image correctors, ink jet printheads, flow sensors, and medical devices. MEMS are fabricated in a fashion similar to microelectronics in the integrated circuit (IC) industry using surface micromachining techniques. Freestanding MEMS structures, such as pivoting mirrors, beamsplitters, lenses, gears, cantilevered beams, and motors, etc. are created at the end of the process flow by removing the oxide matrix surrounding thin film structural members. Polycrystalline silicon (i.e., polysilicon) is to date the most successful MEMS material because many requirements can be satisfied simultaneously. Other structural materials are in use or being explored, such as: aluminum, silicon carbide and "amorphous diamond".

Surface micromachining, LIGA techniques, and thin film techniques such as chemical vapor deposition, sputtering, or pulsed laser ablation can be used to form MEMS structures. For volume production, the same MEMS device will be repeatedly fabricated over the surface of a large diameter (4–12 inches) silicon wafer. Typically, there are fifty or more identical die sites. The microstructure of the resulting films and structures can exhibit cross-wafer non-uniformities, resulting in variations of thickness, height, residual stress, stress gradient, or elastic modulus across the wafer. Both mechanical and surface properties must be sufficiently well controlled to guarantee that the intended design function of the MEMS device is met across the entire wafer. For example, the resonant frequency of an electrostatic comb drive can be sensitive to small variations in residual stress. Also, highly curved comb drive fingers or suspensions (caused by stress gradient) will result in device malfunction. Furthermore, surface properties such as adhesion and friction are very sensitive to processing, and may exhibit cross-wafer non-uniformity as well. Poor quality control of surface properties may result in failure of devices that rely on contact or sliding of surfaces.

A need exists, therefore, for rapid and accurate, non-contact, three-dimensional imaging and metrology of complex features of MEMS structures (as well as other structures, such as thin film structures, e.g., nanoindentation, microfluidic channels, and biological specimens). One conventional metrology technique is Scanning Electron Microscopy (SEM). However, because of electron charging and calibration problems, it is difficult to obtain the required nanometer scale resolution by this technique. Other metrology techniques, such as AFM (Atomic Force Microscope) and contact profilometry, can provide the required nanometer-scale resolution to accurately measure 3-D out-of-plane features of IC's and MEMS devices, but either require extensive sample preparation, or rely on potentially destructive contact with the sample surface. Other non-contact techniques, such as conventional light microscopy, do not provide the required nanometer-scale resolution.

In U.S. Pat. No. 5,990,473, Dickey and Holswade describe an apparatus and method for sensing motion of MEMS structures by reflecting or scattering light off of a corrugated surface (e.g., gear teeth) of a movable member (e.g., a gear). However, this system does not provide nanometer-scale measurement of the surface topography of the MEMS structures.

Optical interference microscopes (e.g., optical profilers) can provide the required accuracy (nanometers to sub-nanometers). These non-contact, non-destructive devices use quantitative interferometric phase-measurement techniques to determine the phase difference between an object point on the sample and a reference surface (typically an optically flat reference mirror). The measured phase difference is then converted into topological information. Computerized analysis of a series of interferograms taken while the reference phase of the interferometer is changed (e.g., by using phase-shifting interferometry) provides rapid and accurate determination of the wavefront phase encoded in the variations of the intensity patterns of the recorded interferograms, requiring only a simple point-by-point calculation to recover the phase. The use of phase-shifting interferometry (PSI) conveniently eliminates the need for finding and following fringe centers. PSI is also less sensitive to spatial variations in intensity, detector sensitivity, and fixed pattern noise. Using calibrated PSI, or similar computer analysis techniques, measurement accuracies as well as 0.1 nanometers can be attained if there are no spurious reflections from interfaces other than the one of interest.

It is highly desirable to perform metrology of IC's and MEMS devices at the wafer scale using a microscope setup on a conventional microelectronics probe station that can align wafers and move rapidly from one die site to the next. During electrical probing of a wafer on the probe station, released MEMS structures can be electrically activated; hence, their motion or mechanical behavior can be tested at the wafer scale (e.g., before the wafer is sliced into individual dies). Consequently, a need also exists for measuring out-of-plane deflections, oscillations, or other dynamic 3-D parameters of actuated MEMS devices with high accuracy and low cost. Electrical probing of the wafer requires a long working distance between the end of the microscope (e.g., tip of the sample objective) and the face of the wafer to permit access from the side of the wafer by a standard commercial electrical probe arm or probe card. The required working distance can be as large as 20–30 mm, depending on the number and size of probes needed to simultaneously reach across the wafer from the side.

Commercially available interference microscopes (e.g., the New View 5000 3-D Surface Profiler manufactured by Zygo, Inc., Middlefield, Conn., or the NT2000 3D Optical Profiler manufactured by Wyko, Inc. of Tuscan, Ariz.) do not have the necessary long working distance required for imaging MEMS structures while being actively probed. Typically, commercial interference microscopes have a free working distance less than approximately 10 mm. This is because they use a special interferometer attachment (e.g., Mirau, Fizeau, or Michelson interference attachment), which contains a beamsplitter and reference mirror surface in a compact arrangement. The interferometer attachment is commonly located in-between the standard sample objective and the sample's surface. This arrangement unfortunately reduces the available free working distance to less than 10 mm (especially at higher magnifications, e.g., 20–50×). Additionally, in this configuration interference fringes cannot be easily obtained through a transparent window (such as might be found in a vacuum chamber) due to the phase shift induced by the window. A need exists, therefore, for an interferometric microscope that has a long working distance, and that can easily image through a transparent window.

A Linnik-type interference microscope (i.e., microinterferometer) provides a long working distance and allows the use of high magnification objectives having high numerical apertures. See U.S. Pat. No. 4,869,593 to Biegen; also U.S. Pat. No. 5,956,141 to Hayashi; also *Advanced Light Microscopy*, Vol. 3, by Maksymilian Pluta, Elsevier Science Publishers, Amsterdam, 1993, pp. 334–347.

FIG. 1 (prior art) illustrates a schematic layout of a standard Linnik microinterferometer, which is based on a Michelson-type two-beam interferometer. For proper operation of this interferometer, the sample objective and the reference objective must be as close to identical optically as possible. Normal manufacturing tolerances do not guarantee that any two objectives intended to be the same (i.e. having the same design and manufacturing specifications) are sufficiently identical for use in a Linnik interferometer. For this reason, optically identical objective pairs for use in a Linnik interferometer are obtained by sorting through a larger number of objectives to find a pair that is sufficiently identical. We will refer to such a pair of well-matched objectives as being "optically identical." In a Linnik microscope, the illumination beam is split into two beams by means of a beamsplitter. The reference beam in the reference arm is directed onto and reflects off of a reference surface (i.e., the reference mirror). The object beam (i.e., sample beam) in the sample arm (i.e., sample circuit) impinges onto and then reflects off of the sample's surface (e.g., MEMS device). The two beams are then recombined after passing back through the beamsplitter, thereby forming an interferometric image (i.e., interferogram) of the sample's surface at the image plane of the microscope.

Most commercially available interference microscopes utilize an incoherent source of light, which limits the coherence length to less than 50 μm. With such a short coherence length, the optical path lengths of the reference arm and the object/sample arm must not differ by more than approximately ~1 μm in order to achieve high contrast interference fringes. An additional requirement is that straight interference fringes be obtained when viewing a sample having an optically flat surface. This requirement is only satisfied when the wavefront curvature of the reference beam precisely matches that of the sample beam. When using incoherent light, these two requirements imply that optical path lengths of the sample arm and the reference arm must be precisely matched, and that the distance from the beamsplitter to the back focal planes of the sample and reference objective assemblies must also be precisely matched.

As described previously, these requirements are satisfied in a standard Linnik interferometric microscope by sorting through and optically testing a large batch of objectives and selecting a pair of "optically identical" objectives. As illustrated in FIG. 1, the pair of optically identical objectives is used to produce high-contrast interference fringes with minimum curvature. It is difficult, time-consuming, and, hence, expensive to obtain two optically identical long working distance (LWD) sample objectives, especially at high magnification (e.g., 50×). In addition, changing the overall magnification of the microscope (e.g., from 5× to 20×) requires that both of the optically identical objectives be changed at the same time, and replaced with another pair of (different power) optically identical objectives, which adds additional time and expensive. So, having a system with, for example, four different magnifications (e.g., 5×, 10×, 20×, and 50×) would require four pairs of optically identical objectives, for a total of eight objectives, which becomes quite expensive.

For any interference microscope, it is important that the system produces high quality interference fringes. In a classic Linnik interference microscope the use of coherent (e.g., laser) illumination can alleviate the problems associated with mismatched optical path lengths because of the long coherence lengths characteristic of laser light. When laser light is used, high quality interferograms can be obtained even when the reference and sample arms have substantially different optical path lengths. This approach is described in U.S. Pat. No. 6,721,094 to Sinclair et al., which is herein incorporated by reference.

However, the present invention uses incoherent illumination, which has several advantages over coherent (e.g., laser) illumination, including:

1. Incoherent illumination provides high image quality due to the lack of speckle that is commonly associated with coherent (laser) light sources.
2. Incoherent illumination provides the ability to distinguish fringes due to the finite fringe envelope characteristic of incoherent illumination; which allows topographic information to be obtained even in the presence of discontinuous surface features.
3. With coherent illumination, all fringes appear identical and there is no simple method to determine the magnitude of a surface step.
4. Incoherent illumination provides the ability to reject reflections from surfaces not under investigation due to the small temporal coherence. Conversely, with coherent illumination, the partial reflections from any interface in the illumination path will combine with the reflection from the surface of interest and produce unwanted interference fringes.
5. Incoherent illumination allows lower cost and compactness of a LED (incoherent) source, as compared to a laser. Multiple illumination wavelengths may easily be employed.
6. Incoherent illumination allows easy implementation of stroboscopic illumination for characterization of repetitive events by simply strobing the bias current to the LED.
7. Incoherent illumination provides the ability to perform real-time transient measurements (i.e., not stroboscopic) without speckle artifacts that accompany coherent illumination (even with using a rotating diffuser).

Gale, et al. describe a Linnik microscope capable of illumination by one of two different sources, namely, a tungsten halogen lamp or a helium-neon laser (see D. M. Gale, M. I. Pether, and J. C. Dainty, "Linnik Microscope Imaging of Integrated Circuit Structures", Applied Optics Vol. 35, No. 1, January, 1996, pp. 131–137). However, this system requires a pair of optically identical objectives (with an aberration less than one-eighth of the operating wavelength), because this is required when the incoherent tungsten halogen lamp is used (i.e., due to the requirement for matching both the optical path lengths and wavefront curvature when using incoherent light).

A need remains, therefore, for a long working distance, incoherent interference microscope that produces flat, high quality, high contrast fringes, and that does not require the use of a expensive, optically identical pairs of sample and reference arm objectives. A need exists, also, for an interference microscope that uses an inexpensive reference beam circuit that requires only minor adjustments when changing sample objections to obtain different magnifications. There is also a need to allow imaging through a glass window that requires only minor adjustments of the system.

Against this background, the present invention was developed.

BRIEF DESCRIPTION OF THE DRAWINGS

The accompanying drawings, which are incorporated in and form part of the specification, illustrate various examples of the present invention and, together with the description, serve to explain the principles of the invention.

BRIEF SUMMARY OF THE INVENTION

The present invention relates to full-field imaging, long working distance, incoherent interference microscope suitable for three-dimensional imaging and metrology of MEMS devices and test structures on a standard microelectronics probe station. A long working distance of 10–30 mm allows standard probes or probe cards to be used. This enables nanometer-scale 3-dimensional height profiles of MEMS test structures to be acquired across an entire wafer while being actively probed, and, optionally, through a transparent window. An optically identical pair of sample and reference arm objectives is not required, which reduces the overall system cost, and also the cost and time required to change sample magnifications. Using a LED source, high magnification (e.g., 50×) can be obtained having excellent image quality, straight fringes, and high fringe contrast.

DETAILED DESCRIPTION OF THE INVENTION

Figure 1:
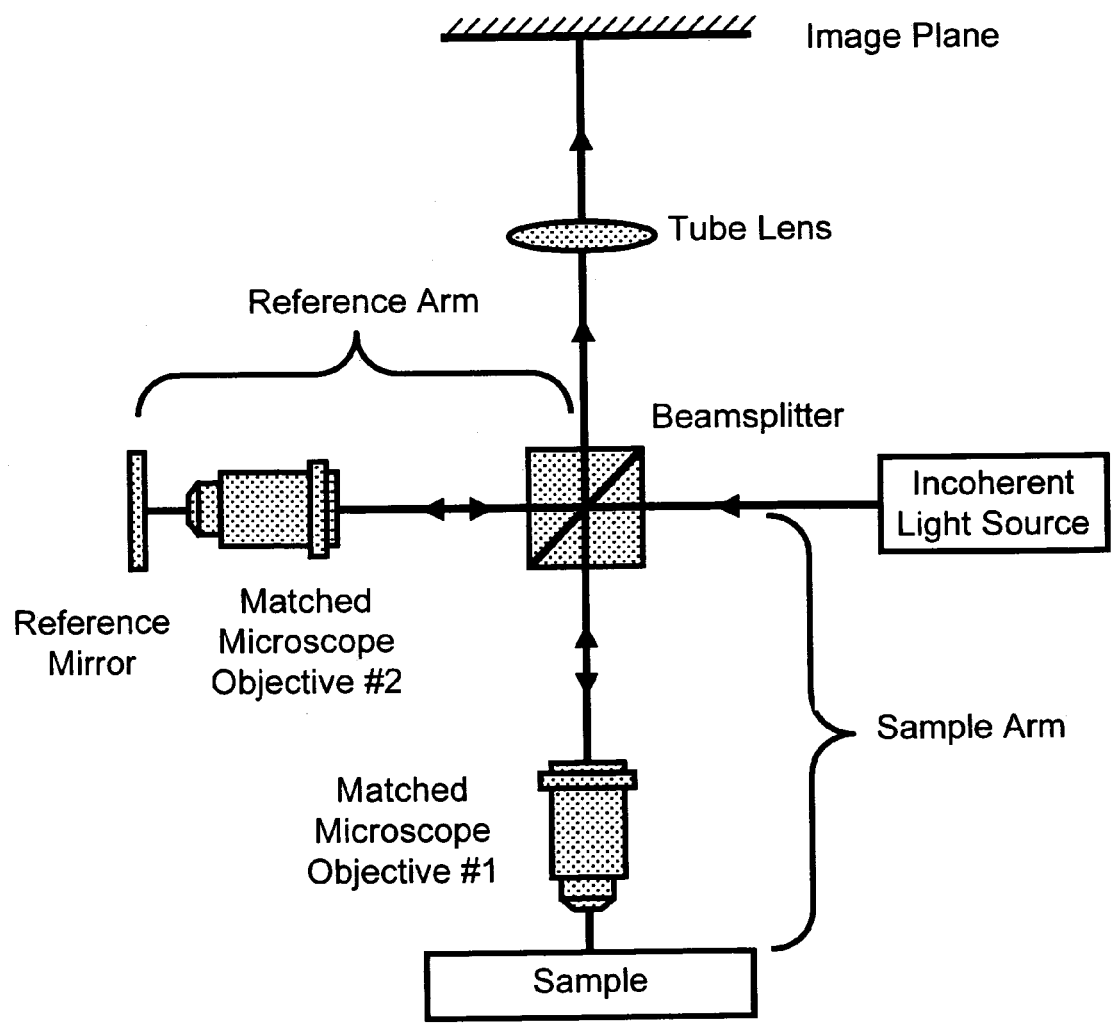
FIG. 1 (prior art) illustrates a schematic layout of a standard Linnik microinterferometer.

FIG. 1 (prior art) illustrates a schematic layout of a well-known Linnik microinterferometer, which is based on a two-beam Michelson interferometer. The Linnik microinterferometer requires a pair of optically identical sample and reference objectives when operated with an incoherent light source, such as a LED.

Figure 2:
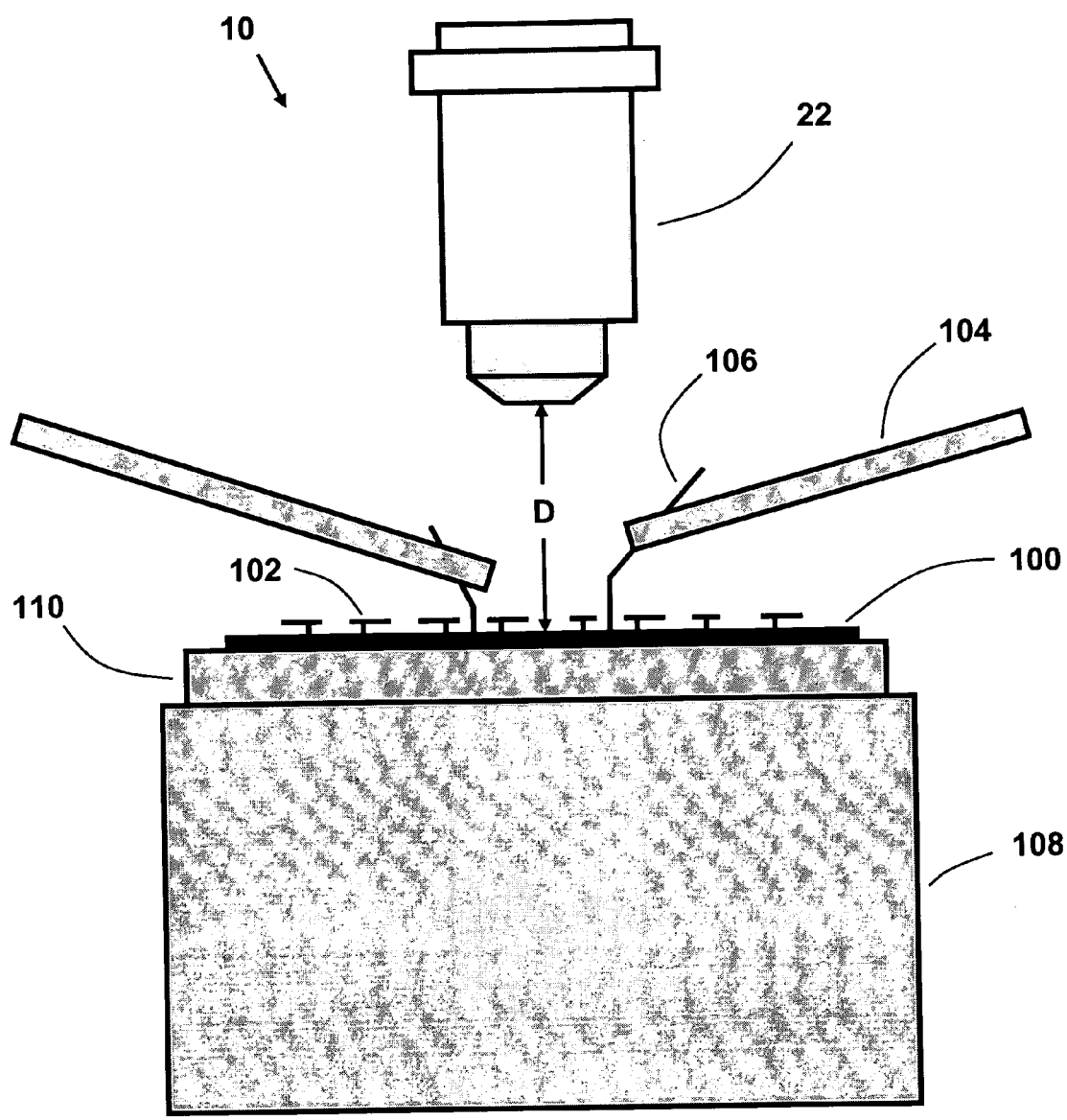
FIG. 2 illustrates a schematic side view of an application of a long working distance incoherent interference microscope, according to the present invention.

FIG. 2 illustrates a schematic side view of a first example of a long working distance incoherent interference microscope 10, according to the present invention. Microscope 10 has a long working distance (LWD) sample objective 22, with its tip located at a distance=D above the surface of silicon wafer 100. Wafer 100 has MEMS structures 102 surface micromachined on its surface. Wafer 100 is held in place by a positioning stage 110, which is part of a microelectronics probe station 108. Microelectronic probe arm 104 holds probe tip 106, which touches the surface of wafer 100 and electrically activates selected MEMS elements 102. Using commercially available probes 104 (or probe cards, not shown), a minimum working distance D equal to 10–30 mm must be provided to allow adequate access from the side of wafer 100.

Figure 3A:
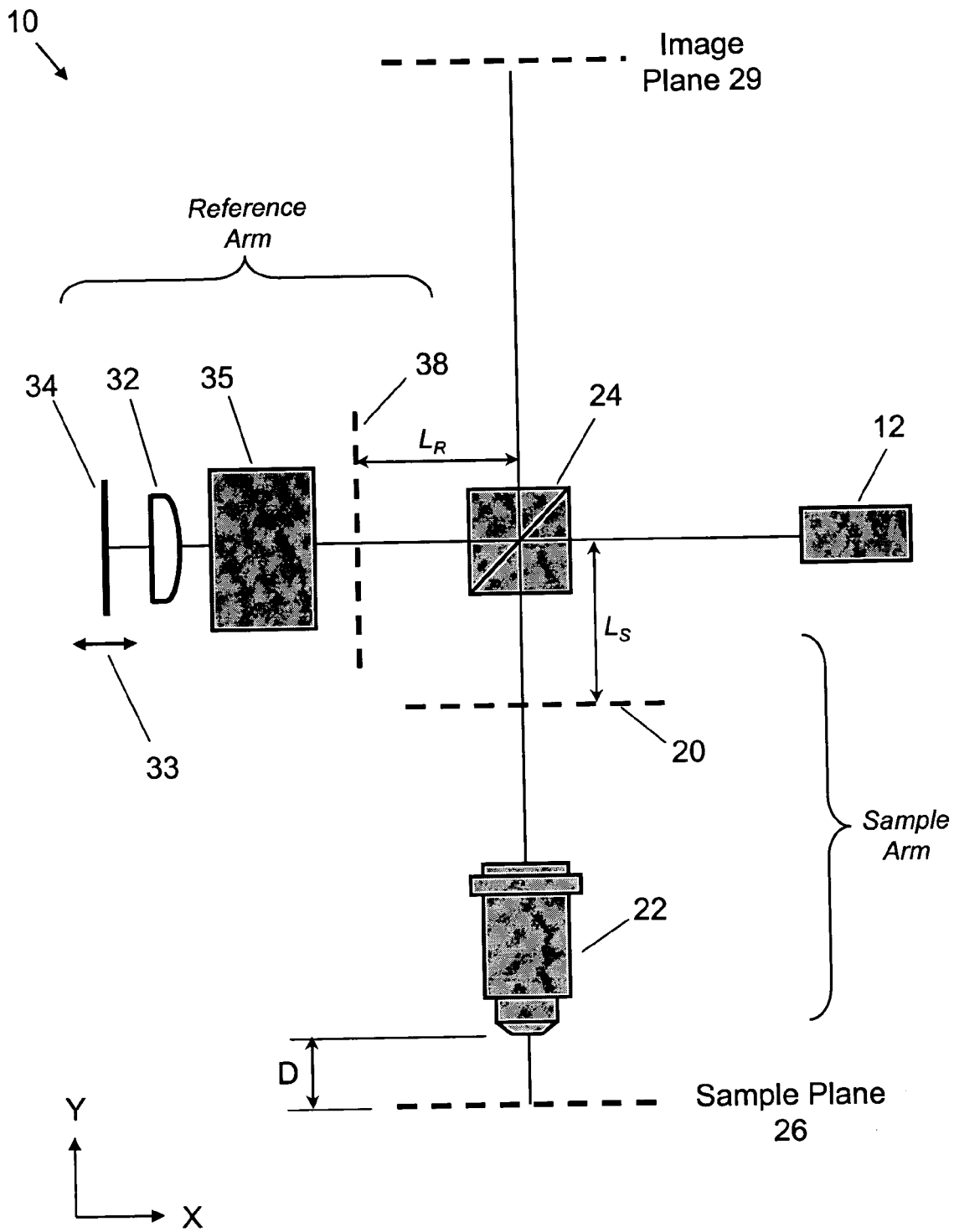
FIG. 3A illustrates a schematic layout of a second example of a long working distance incoherent interference microscope, according to the present invention.
Figure 3B:
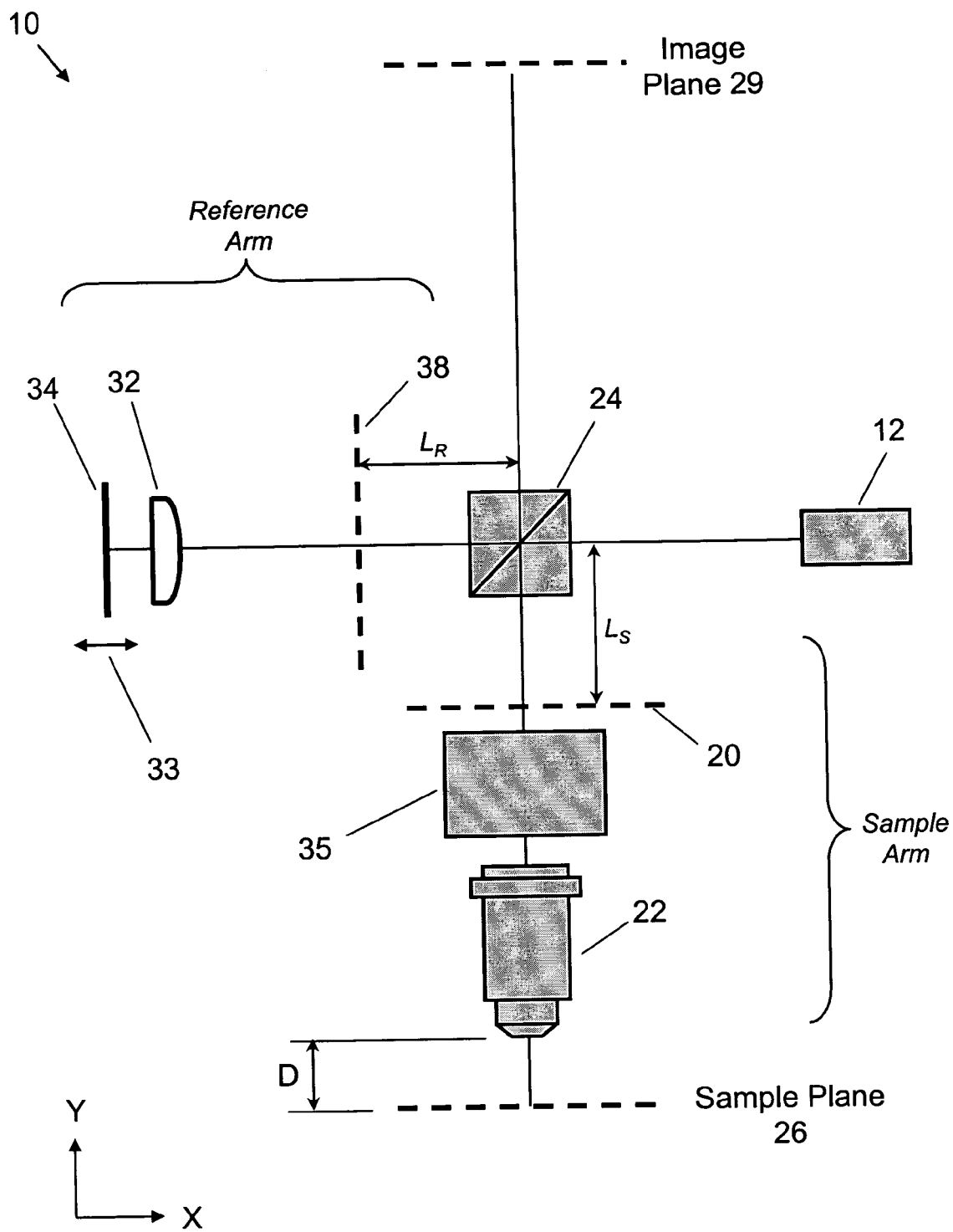
FIG. 3B illustrates a schematic layout of a third example of a long working distance incoherent interference microscope, according to the present invention.

FIGS. 3A and 3B illustrates schematic layouts of a second and third examples of a long working distance incoherent interference microscope 10 according to the present invention. Interference microscope 10 is based on a two-beam Michelson-style interferometer, having a reference arm and a sample arm. Sample plane 26 is positioned at the front focal point of sample objective 22. The position of sample plane 26 relative to sample objective 22 may be adjusted to achieve a sharp front focus by either changing the position of sample plane 26 along the optic axis, or by changing the position of the sample objective 22 (or by changing both).

In FIGS. 3A and 3B, incoherent illumination light is generated by incoherent light source 12. Beamsplitter 24 directs the illumination light from source 12 into both the sample and reference arms of interferometer 10. Sample objective 22 may be, for example, a long working distance objective manufactured by Mitutoyo Corporation with power 10× and N.A. 0.28. The illumination light that is reflected off the surface of a sample located at sample plane 26 is gathered by sample objective 22, which passes back through beamsplitter 24 to form a real, full-field image of the sample at image plane 29.

The optical train of interferometer 10 must simultaneously satisfy two separate requirements, according to the present invention.

The first requirement is that interferometer 10 must contain optical path length matching means for precisely matching the optical path length of the reference arm to the path length of the sample arm. This is necessary because the coherence length of incoherent illumination sources is quite small (~10 μm). Hence, the path length of the two arms of interferometer 10 must be matched to a small fraction of the coherence length for high quality fringes to be observed. This may be accomplished in a variety of ways. The optical path length matching means may comprise, for example, a translation stage (not shown), which translates all of the optics in the reference arm together as a rigid group along the reference arm's optical axis. Alternatively, the optical path length matching means may comprise means for adjusting the axial position of reference mirror 34, for example, by using a 1-D, 2-D, or 3-D high precision actuator, such as a 3-D piezoelectric transducer platform (with a positional accuracy of, say, 10 nanometers), without using a translation stage. Alternatively, the optical path length matching means may comprise means for adjusting the axial position of the axial position of sample plane 26.

The second requirement is that interferometer 10 must contain wavefront curvature matching means 35 that allow straight fringes to be produced. In general, the interference fringes obtained with different optics in the two arms of an interferometer will be circular, due to mismatches between the wavefront curvature (i.e., divergences) of the sample and reference beams. We have solved this problem by incorporating wavefront curvature matching means 35 in either the reference arm or sample arm. In FIG. 3A, matching means 35 is shown located in the reference arm. Alternatively, in FIG. 3B, matching means 35 is shown located in the sample arm. Wavefront curvature matching means 35 may comprise, for example, a low power Galilean telescope (not shown, to be discussed later). To obtain straight interference fringes, wavefront curvature matching means 35 may be adjusted so that the distance, $L_R$, between the back focal plane 38 of the reference objective 32 and the center of beamsplitter 24 precisely matches the distance, $L_S$, between the back focal plane 20 of sample objective 22 and the center of beamsplitter 24 (i.e., $L_R=L_S$). Hence, by adjusting wavefront curvature matching means 35, the wavefront curvatures of the sample and reference arms can be precisely matched to each other, thereby producing straight interference fringes.

When both of these two requirements are satisfied, it is not necessary to use optically identical sample and reference objectives, 22 and 32, respectively (as would be the case for a standard Linnik microinterferometer). Rather, reference objective 32 may comprise a simple, low cost lens, such as a simple doublet lens, a triplet lens, or an achromatic lens with low spherical aberration. Alternatively, reference objective 32 may comprise a microscope objective having nominally the same power and numerical aperture as sample objective 22. However, in this case, there is no requirement that sample and reference objectives, 22 and 32, respectively, be optically identical.

Figure 4:
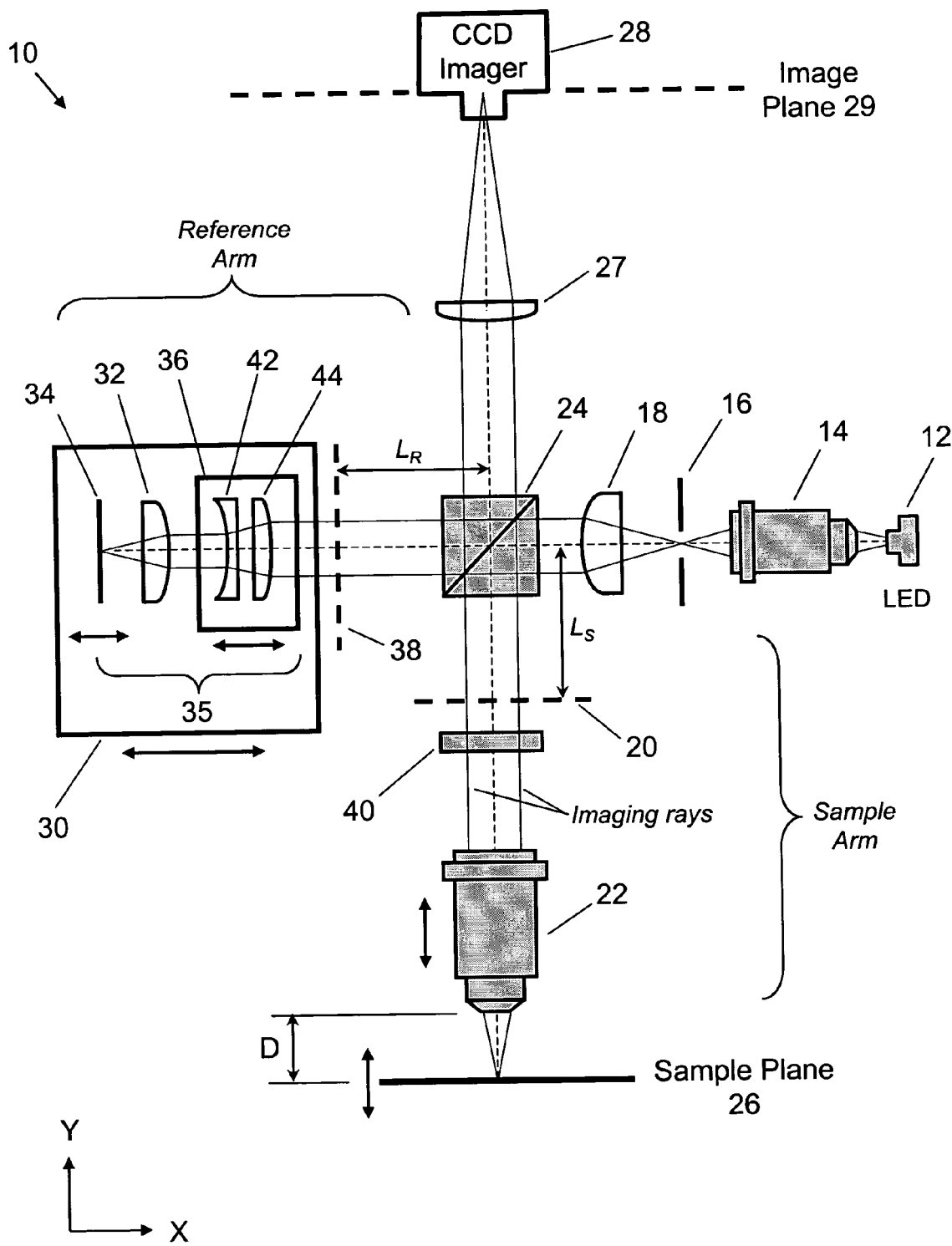
FIG. 4 illustrates a schematic layout of a fourth example of a long working distance incoherent interference microscope, according to the present invention.

FIG. 4 illustrates a schematic layout of a fourth example of a long working distance incoherent interference microscope 10 according to the present invention. Interference microscope 10 is based on a two-beam Michelson-style interferometer, having a reference arm and a sample arm. Sample plane 26 is positioned at the front focal point of sample objective 22. The position of sample plane 26 relative to sample objective 22 may be adjusted to achieve a sharp front focus by either changing the position of sample plane 26 along the optic axis, or by changing the position of the sample objective 22 (or by changing both).

In FIG. 4, incoherent illumination light is generated by an incoherent light source 12, for example, by a Light Emitting Diode (LED), incandescent bulb, or arc lamp. Incoherent source 12 may be a bright green LED source (e.g., 532 nm). Output from LED 12 is collimated by microscope/collimating objective 14 and directed through field iris 16 (i.e., field stop); where it impinges on converging lens 18 located at one focal length from the field iris 16. Converging lens 18 focuses the illumination light at the location of the back focal plane 20 of sample objective 22, after being turned 90 degrees by beamsplitter 24. Beamsplitter 24 directs the illumination light into both the sample and reference arms of interferometer 10. Sample objective 22 may be, for example, a long working distance Mitutoyo objective with power 10× and N.A. 0.28. The illumination light that is reflected off the surface of a sample located at sample plane 26 is gathered by sample objective 22, which passes back through beamsplitter 24 and tube lens 27 to form a real, full-field image of the sample at image plane 29, where an imaging device 28 is located, such as a CCD imager. The solid light rays in FIG. 4 depict imaging ray traces.

In FIG. 4 the reference arm of interferometer 10 is substantially more complex than the sample arm, since it may contain all of the adjustments necessary to allow high quality, full-field interference images to be obtained with a variety of sample objectives 22 having different powers.

For the first requirement, the path length of the two arms of the interferometer must be matched to a small fraction of the coherence length for high quality fringes to be observed. In the example shown in FIG. 4, all of the optical components of the reference arm are fixed to translation stage 30, which translates the optics together as a rigid group along the reference arm's optical axis.

For the second requirement, the system must contain controls that allow straight fringes to be produced. In general, the interference fringes obtained with different optics in the two arms of the interferometer will be circular, due to mismatches between the wavefront curvature (i.e., divergences) of the sample and reference beams. We have solved this problem by incorporating a low power (0.5× –1.5×) Galilean telescope 36 in the reference arm Rigid translation of telescope 36 relative to reference objective 32 allows the position of the back focal plane 38 of reference arm optical assembly 35 to be adjusted to precisely correspond to the position of the back focal plane 20 in the sample arm (i.e., $L_R=L_S$), thereby allowing the wavefront curvatures of the sample and reference arms to be precisely matched to each other.

Reference arm optical assembly 35 includes reference mirror 34, reference objective 32, and Galilean telescope 36. Assembly 35 is attached to translation stage 30; and the position of telescope 36 relative to translation stage 30 is adjustable, as well. Low-power Galilean telescope 36 may comprise, for example, a pair of simple diverging and converging lenses, 42 and 44, respectively. Alternatively, telescope 36 may comprise a more complex, aberration corrected, afocal optical assembly Although not required, an additional element of the present invention may include GVD matching means for closely matching the total amount of Group Velocity Dispersion (GVD) between the two arms of interferometer 10, which maximizes the fringe contrast. The phenomenon of GVD results from the wavelength dependence of the refractive index of the optical materials in the light path. The result is that longer wavelengths tend to travel through materials faster than shorter wavelengths (i.e., longer wavelengths encounter a lower refractive index than shorter wavelengths). A finite coherence packet from an incoherent source contains many different wavelengths. If this packet is split in two and the two packets traverse paths containing different amounts of GVD, then when the packets are recombined, there will not be a precise registry between the crests and troughs of the electromagnetic fields. The result is often a highly broadened fringe packet containing low contrast fringes. We have solved this problem by adding one or more GVD compensating plates 40 to the either the reference arm or sample arm of interferometer 10, or to both arms.

The optional GVD plate 40 may be used to optimize fringe contrast. Without the GVD plate 40, interferometer 10 would likely produce a broad, low contrast fringe envelope. However, if the optical elements in the reference arm were designed with the correct thickness and type of glass, the use of GVD plate 40 could be eliminated, and high contrast fringes would be produced. However, for standard, off-the-shelf optical lenses, use of GVD plate 40 allows the net Group Velocity Dispersion to be balanced between the two arms. If the sample arm has more GVD than the reference arm, then a GVD plate may be placed in the reference arm. Conversely, if the reference arm has more GVD than the sample arm, then a GVD plate may be placed in the sample arm. For example, in FIG. 4, GVD plate 40 is located in the sample arm, which corresponds to the example situation where the reference arm has more GVD than the sample arm. In general, a different compensating plate 40 would be used when the imaging power of sample objective 22 is changed.

There also may be situations where one would like to use more than one GVD plate; with more than one plate being located in the reference arm, or more than one plate being located in the sample arm, or with a combination of plates in both arms. This would allow further minimization of the GVD difference between the two arms.

When both of these above-mentioned requirements are satisfied, and when the optional GVD compensating plate 40 is used, then the user can easily obtain high contrast interferometry conditions when changing from one sample objective 22 to another of a different power, within a few minutes. Hence, in comparison to a standard Linnik interference microscope, changing sample objectives 22 in the present invention is much less expensive, and easier, since there is no need to use a well-matched pair of optically identical sample and reference objectives.

An image processor (not shown), such as a computer using image-processing software, can be used to process the output of image processing means 28 (e.g., CCD imager 28) and provide a topographic profile of the surface of a sample.

Unlike the Linnik microinterferometer described previously in FIG. 1, the present invention does not require the use of a pair of optically identical objectives in the sample and reference arms. In the present invention, the use of low power Galilean telescope 36 with optional GVD compensating plate 40 allows a simple, low cost reference objective 32 (such as a simple doublet lens, a triplet lens, or an achromatic lens with low spherical aberration) to successfully replace one of the two microscope objectives in a standard Linnik microscope, without any loss of performance, and with a substantial savings in cost. Nevertheless, the wavefront curvature of the reference arm must match that of the sample arm in order to obtain straight interference fringes. This is achieved by matching the distance, $L_R$, between the back focal plane 38 of the reference arm optical assembly 35 and the center of beamsplitter 24, with the distance, $L_S$, between the back focal plane 20 of sample objective 22 and the center of beamsplitter 24. Equivalently, the wavefront curvatures of the two arms are matched when $L_R=L_S$.

Referring still to FIG. 4, interference microscope 10 can be supported on a vibration isolation table (not shown) to reduce undesirable vibrations. Incoherent light source 12 can be a 532 nm (green light) LED. The choice of green light (e.g., 532 nm) is particularly useful because MEMS structures made of polysilicon are opaque and reflective at this wavelength. Additionally, commercially available optics are typically manufactured to have minimal aberration errors at the wavelength of green light, since green light is near the center of the visible spectrum. Sample objective 22 can be, for example, a long working distance (LWD), infinity-corrected, Plan-Apo 10× objective, with a 33 mm working distance (e.g., Mitutoyo M Plan Apo 10×).

Referring still to FIG. 4, the position of sample objective 22 can be moved axially along the sample arm's optic axis (i.e., parallel to the Y-axis) to adjust the front focal point of objective 22 onto the sample plane 26. Objective 22 can also be moved axially to adjust the position of its back focal plane 20 relative to the center of beamsplitter 24, in order to adjust $L_S$. Likewise, the axial position (i.e., parallel to the X-axis) of reference objective 32 can be moved along the reference arm's optic axis to adjust its position. Straight interference fringes can be obtained when $L_R=L_S$. Additionally, the relative distance between reference mirror 34 and reference objective 32 can be independently adjusted to achieve a sharp front focus at the front focal plane of reference objective 32.

Referring still to FIG. 4, reference arm optical assembly 35, comprising reference mirror 34, reference objective 32, and telescope 36, can be attached to translation stage 30. Stage 30 can be rigidly translated as a single unit to adjust the optical path length of the reference arm to precisely match the path length of the sample arm. In addition, the axial position of Galilean telescope 36 can be adjusted to adjust the position of back focal plane 38 of reference arm optical assembly 35, thereby allowing the wavefront curvature of the reference beam to precisely match the wavefront curvature of the sample beam. In this manner, straight interference fringes may be obtained.

When sample objective 22 is changed to provide a different magnification power (e.g., when changing from 5× to 10× or 50×), the optical path lengths of the two arms of the interferometer can be easily matched by simply translating stage 30 along the reference arm's optic axis. In addition, small adjustments of the axial position of the back focal plane 38 of the reference arm can be made to obtain straight interference fringes by translating Galilean telescope 36 relative to stage 30 along the optical axis of the reference arm.

Referring still to FIG. 4, reference mirror 34 can be mounted on a high precision translation actuator (not shown), such as a 3-D piezoelectric transducer platform, to allow mirror 34 to be precisely translated along the optical axis to enable phase shifting interferometry (PSI) techniques to be used for topography measurements. Optionally, stage 30 can be equipped with a high precision actuator (not shown) to enable PSI measurements. Additionally, a high precision actuator may also be used to translate sample plane 26 to allow both PSI and vertical scanning interferometry (VSI) techniques to be employed simultaneously.

The particular examples discussed above are cited to illustrate particular embodiments of the invention. Other applications and embodiments of the apparatus and method of the present invention will become evident to those skilled in the art. For example, the tube lens 27 in the imaging part of interferometer 10 can include zoom-lens elements (not shown) for providing a continuously adjustable magnification range of greater than twenty without changing objectives. In addition, stroboscopic illumination can be produced by rapidly pulsing LED light source 12 to allow fast dynamic measurements of moving specimens.

The actual scope of the invention is defined by the claims appended hereto.

We claim:

1. A two-beam, full-field imaging interference microscope, comprising:
   a source of incoherent light;
   a beamsplitter, optically aligned with the source of incoherent light;
   a sample objective optically aligned with the beamsplitter, disposed in a sample arm;
   a reference mirror optically aligned with the beamsplitter, disposed in a reference arm;
   a reference objective optically aligned with the beamsplitter, disposed in the reference arm;
   optical path length matching means for matching the optical path lengths of the reference and sample arms;
   wavefront curvature matching means for matching the wavefront curvatures of the reference and sample arms; and
   image forming means, optically aligned with both the sample arm and the reference arm, and disposed on the opposite side of the beamsplitter from the sample objective, for forming at an image plane a combined real full-field image of both the surface of the sample and the surface of the reference mirror, whereby said combined real image contains one or more interference fringes;

wherein the reference objective is not optically identical to the sample objective.

2. The interference microscope of claim 1, wherein the reference objective is not a conventional microscope objective.

3. The interference microscope of claim 2, wherein the reference objective comprises one or more simple lenses selected from the group consisting of a doublet lens, a triplet lens, and an achromatic lens.

4. The interference microscope of claim 1, wherein the optical path length matching means comprises means for adjusting the position of the reference mirror along the reference arm's optical axis.

5. The interference microscope of claim 4, wherein the means for adjusting the position of the reference mirror comprises a high precision piezoelectric transducer platform onto which the reference mirror is attached.

6. The interference microscope of claim 4, wherein the means for adjusting the position of the reference mirror comprises a translation stage upon which the reference mirror is attached.

7. The interference microscope of claim 1, wherein the optical path length matching means comprises means for adjusting the position of the sample plane relative to the beamsplitter.

8. The interference microscope of claim 1, wherein the wavefront curvature matching means comprises a Galilean telescope disposed in either the reference or sample arm.

9. The interference microscope of claim 8, wherein the Galilean telescope comprises a pair of simple diverging and converging lenses.

10. The interference microscope of claim 8, wherein the Galilean telescope comprises an aberration corrected, afocal optical assembly.

11. The interference microscope of claim 8, further comprising adjustment means for adjusting the position of the Galilean telescope along its optical axis.

12. The interference microscope of claim 8, wherein the Galilean telescope has a low power in-between about 0.5× and 1.5×.

13. The interference microscope of claim 1, wherein the wavefront curvature matching means comprises a Galilean telescope disposed in the reference arm; and wherein the reference mirror, the reference objective, and the Galilean telescope are all attached to a translation stage capable of moving along the reference arm's optical axis.

14. The interference microscope of claim 13, further comprising adjustment means for adjusting the position of the Galilean telescope relative to the translation stage.

15. The interference microscope of claim 1, wherein the image forming means comprises a tube lens, optically aligned between the beamsplitter and the image plane of the tube lens.

16. The interference microscope of claim 15, wherein the tube lens comprises a zoom lens assembly.

17. The interference microscope of claim 1, further comprising one or more Group Velocity Dispersion (GVD) compensating plates disposed in either the reference arm or the sample arm.

18. The interference microscope of claim 1, wherein the optical elements in the reference arm comprise the correct thickness and type of glass so that the Group Velocity Dispersion of the reference arm matches the Group Velocity Dispersion of the sample arm.

19. The interference microscope of claim 1, wherein the source of incoherent light comprises one or more sources selected from the group consisting of a LED, an incandescent bulb, and an arc lamp.

20. The interference microscope of claim 19, wherein the source of incoherent light comprises a green light LED.

21. The interference microscope of claim 1, wherein the free working distance between the surface of a sample and the tip of the sample objective is greater than about 10 mm.

22. The interference microscope of claim 15, further comprising an imaging device disposed at the image plane of the tube lens.

23. The interference microscope of claim 22, further comprising means for processing the output from the imaging device and providing a topographic profile of the sample's surface.

24. The interference microscope of claim 22, wherein the imaging device comprises a high speed CCD camera.

25. The interference microscope of claim 1, further comprising means for isolating vibrations within the microscope.

26. The interference microscope of claim 1, further comprising means for strobing the source of incoherent light.

27. The interference microscope of claim 1, further comprising means for adjusting the relative position of the sample objective with respect to the sample plane.

28. The interference microscope of claim 1, further comprising a collimating microscope objective disposed in-between the source of incoherent light and the beamsplitter.

29. The interference microscope of claim 28, further comprising a field stop disposed in-between the collimating microscope objective and the beamsplitter.

30. The interference microscope of claim 28, further comprising a converging lens disposed in-between the field stop and the beamsplitter.

31. The interference microscope of claim 1, wherein the distance, $L_R$, between the back focal plane of the reference objective and the center of the beamsplitter matches the distance, $L_S$, between the back focal plane of the sample objective and the center of the beamsplitter, whereby the wavefront curvatures of the sample arm and the reference arm match each other.

32. A two-beam, full-field imaging interference microscope, comprising:
   a source of incoherent light;
   a beamsplitter, optically aligned with the incoherent light source;
   a sample objective, optically aligned with the beamsplitter along a sample arm; and
   a reference arm optical assembly, optically aligned with the beamsplitter along a reference arm, comprising a reference mirror, a reference objective, and a Galilean telescope;
   a translation stage optically aligned with the beamsplitter along the reference arm; and
   image forming means, optically aligned with both the sample arm and the reference arm, and disposed on the opposite side of the beamsplitter from the sample objective, for forming at an image plane a combined real full-field image of both the surface of the sample and the surface of the reference mirror, whereby said combined real image contains one or more interference fringes;
   wherein the reference arm optical assembly is rigidly attached to the translation stage; and
   wherein the translation stage comprises adjustment means for adjusting the position of the Galilean telescope with respect to the translation stage.

33. A two-beam, full-field imaging interference microscope, comprising:
- a source of incoherent light;
- a beamsplitter, optically aligned with the incoherent light source;
- a sample objective, optically aligned with the beamsplitter, and disposed in the sample arm;
- a reference mirror, optically aligned with the beamsplitter, and disposed in the reference arm, wherein the reference mirror is attached to a first high precision actuator;
- a reference objective, optically aligned with the beamsplitter, and disposed in the reference arm, wherein the reference objective is attached to a second high precision actuator;
- a Galilean telescope, optically aligned with the beamsplitter, and disposed in the reference arm, wherein the Galilean telescope is attached to a third high precision actuator; and
- image forming means, optically aligned with both the sample arm and the reference arm, and disposed on the opposite side of the beamsplitter from the sample objective, for forming at an image plane a combined real full-field image of both the surface of the sample and the surface of the reference mirror, whereby said combined real image contains one or more interference fringes.

* * * * *